(12) United States Patent
Watanabe (10) Patent No.: US 7,368,498 B2
(45) Date of Patent: May 6, 2008

(54) POLYPROPYLENE RESIN COMPOSITION AND INJECTION-MOLDED ARTICLE MADE OF THE SAME

(75) Inventor: Tsuyoshi Watanabe, Ichihara (JP)

(73) Assignee: Sumitomo Chemical Company Limited, Tokyo (JP)

( * ) Notice: Subject to any disclaimer, the term of this patent is extended or adjusted under 35 U.S.C. 154(b) by 382 days.

(21) Appl. No.: 10/948,977

(22) Filed: Sep. 24, 2004

(65) Prior Publication Data

US 2005/0075439 A1 Apr. 7, 2005

(30) Foreign Application Priority Data

Oct. 1, 2003 (JP) .............................. 2003-343254

(51) Int. Cl.
*C08K 53/00* (2006.01)
(52) U.S. Cl. ..................................... 524/505
(58) Field of Classification Search ................. 524/505
See application file for complete search history.

(56) References Cited

U.S. PATENT DOCUMENTS

2002/0004546 A1 1/2002 Ohkawa et al.

2003/0100664 A1 5/2003 Okawa et al.

FOREIGN PATENT DOCUMENTS

| EP | 0 669 372 A1 | 2/1995 |
| JP | 8-59953 A | 3/1996 |
| JP | 2002-012718 A | 1/2002 |
| JP | 2003-128855 A | 5/2003 |

*Primary Examiner*—Peter D. Mulcahy
(74) *Attorney, Agent, or Firm*—Panitch Schwarze Belisario & Nadel LLP (57) ABSTRACT

Disclosed is a polypropylene-based resin composition including:

from 60 to 94.9% by weight of propylene-ethylene block copolymer (A) which has a propylene homopolymer portion (A1) in a content of from 60 to 75% by weight and a propylene-ethylene random copolymer portion (A2) in a content of from 25 to 40% by weight or a mixture of the propylene-ethylene block copolymer (A) and 20% by weight or less of propylene homopolymer, from 0.1 to 15% by weight of resin (B) which has a melt tension of 0.03 N or more, a swelling ratio of 1.5 or more and a relaxation time of 5 seconds or more; and from 5 to 25% by weight of inorganic filler (C).

8 Claims, 3 Drawing Sheets

POLYPROPYLENE RESIN COMPOSITION AND INJECTION-MOLDED ARTICLE MADE OF THE SAME

BACKGROUND OF THE INVENTION

1. Technical Field

The present invention relates to polypropylene resin compositions and injection-molded articles made of the polypropylene resin compositions. Particularly, the invention relates to polypropylene resin compositions which are capable of affording molded articles superior in impact resistance and appearance and, in particular, which hardly suffer from occurrence of flow marks when being molded. The invention also relates to injection-molded articles made of such polypropylene resin compositions.

2. Description of the Related Art

Polypropylene resin has been used as a material of automotive parts. For instance, JP-A-8-59953, also published as EP 0 669 372 A1, discloses a polypropylene resin composition for automotive interior parts, the composition comprising a propylene-ethylene block copolymer comprising a propylene-ethylene random copolymer portion having an average intrinsic viscosity [η] of 7 to 12 dl/g and an inorganic filler, the composition being superior in balance between rigidity and low-temperature brittle temperature and also being superior in fluidity.

In JP-A-2002-12718, also published as US 2002/0004546 A1, and JP-A-2003-128855, also published as US 2003/0100664 A1, disclosed as a thermoplastic resin composition which is superior in rigidity, impact strength and fluidity and which is capable of affording molded articles with good appearance is a thermoplastic resin composition containing a polypropylene resin, an elastomer, an inorganic filler and a resin having a melt tension within a specific range and a swelling ratio within a specific range and needing a time within a specific range until its relaxation modulus ratio reaches 0.01, wherein the content of the elastomer is from 10 to 35% by weight.

Molded articles, in particular, materials for automobiles have recently been required to have a superior impact resistance. For instance, molded articles made of the resin compositions disclosed in the above-cited publications have been required to have an improved impact resistance.

SUMMARY OF THE INVENTION

The present invention is intended to provide a polypropylene resin composition which is capable of affording molded articles superior in impact resistance and appearance and, in particular, which hardly suffers from occurrence of flow marks when being molded. The invention is also intended to provide an injection-molded article made of such a resin composition.

In one aspect of the present invention provided is a polypropylene-based resin composition comprising:

from 60 to 94.9% by weight of propylene-ethylene block copolymer (A) which satisfies requirement (A-1) and (A-2) defined below or a mixture of the propylene-ethylene block copolymer (A) and 20% by weight or less of propylene homopolymer, wherein the copolymer (A) does not satisfy one or more of the requirements (B-1), (B-2) and (B-3) defined below;

from 0.1 to 15% by weight of resin (B) which satisfies the requirement (B-1), (B-2) or (B-3); and from 5 to 25% by weight of inorganic filler (C), wherein said amounts of the components (A), (B) and (C) are each based on the combined weight of these components and said amount of the propylene homopolymer is based on the weight of the mixture of the propylene-ethylene block copolymer (A) and the propylene homopolymer:

requirement (A-1): the copolymer is a propylene-ethylene block copolymer composed of a propylene homopolymer portion (A1) and a propylene-ethylene random copolymer portion (A2);

requirement (A-2): the copolymer has a propylene homopolymer portion (A1) in a content of from 60 to 75% by weight and a propylene-ethylene random copolymer portion (A2) in a content of from 25 to 40% by weight, wherein said contents of A1 and A2 are each based on the weight of the propylene-ethylene block copolymer composed of the portions A1 and A2 and the sum of both contents is 100% by weight;

requirement (B-1): the resin has a melt tension (MT), measured at 190° C. at a winding rate of 15.7 m/min, of 0.03 N or more;

requirement (B-2): the resin has a swelling ratio (SR), measured at 220° C. at an orifice L/D of 40 and at a shear rate of $1.2 \times 10^3$ sec$^{-1}$, of 1.5 or more; and requirement (B-3): when the resin is measured for its relaxation modulus at 210° C., it needs 5 seconds or more, measured from the start of the measurement, until it exhibits a relaxation modulus G(t) satisfying an equation G(t)/G(0.02)=0.01 wherein G(0.02) represents a relaxation modulus exhibited at a time of 0.02 seconds measured from the start of the measurement.

In another aspect of the present invention provided is a polypropylene-based resin composition comprising: from 59 to 94.8% by weight of propylene-ethylene block copolymer (A) which satisfies requirement (A-1) and (A-2) defined below or a mixture of the propylene-ethylene block copolymer (A) and 20% by weight or less of propylene homopolymer, wherein the copolymer (A) does not satisfy one or more of the requirements (B-1), (B-2) and (B-3) defined below;

from 0.1 to 15% by weight of resin (B) which satisfies the requirement (B-1), (B-2) or (B-3);

from 5 to 25% by weight of inorganic filler (C); and from 0.1 to 4% by weight of elastomer (D), wherein said amounts of the components (A), (B) (C) and (D) are each based on the combined weight of these components and said amount of the propylene homopolymer is based on the weight of the mixture of the propylene-ethylene block copolymer (A) and the propylene homopolymer:

requirement (A-1): the copolymer is a propylene-ethylene block copolymer composed of a propylene homopolymer portion (A1) and a propylene-ethylene random copolymer portion (A2);

requirement (A-2): the copolymer has a propylene homopolymer portion (A1) in a content of from 60 to 75% by weight and a propylene-ethylene random copolymer portion (A2) in a content of from 25 to 40% by weight, wherein said contents of A1 and A2 are each based on the weight of the propylene-ethylene block copolymer composed of the portions A1 and A2 and the sum of both contents is 100% by weight;

requirement (B-1): the resin has a melt tension (MT), measured at 190° C. at a winding rate of 15.7 m/min, of 0.03 N or more;

requirement (B-2): the resin has a swelling ratio (SR), measured at 220° C. at an orifice L/D of 40 and at a shear rate of $1.2 \times 10^3$ sec$^{-1}$, of 1.5 or more; and requirement (B-3): when the resin is measured for its relaxation modulus at 210° C., it needs 5 seconds or more, measured from the start of the measurement, until it exhibits a relaxation modulus G(t) satisfying an equation G(t)/G (0.02)=0.1 wherein G(0.02) represents a relaxation modulus exhibited at a time of 0.02 seconds measured from the start of the measurement.

In yet another aspect of the present invention provided are injection-molded articles made of the above polypropylene resin compositions.

According to the present invention, a polypropylene resin composition can be provided which is capable of affording molded articles superior in impact resistance and appearance and, in particular, which hardly suffers from occurrence of flow marks when being molded. In addition, an injection-molded article made of such a resin composition can also be provided.

DESCRIPTION OF THE PREFERRED EMBODIMENTS

The propylene-ethylene block copolymer (A) used in the present invention is a copolymer made up of a propylene homopolymer portion (A1) and a propylene-ethylene random copolymer portion (A2); this is called requirement (A-1).

As to the weight percentages of the propylene homopolymer portion (A1) and the propylene-ethylene random copolymer portion (A2) in the propylene-ethylene block copolymer (A), the homopolymer portion (A1) and the random copolymer portion (A2) account for from 60 to 75% by weight and from 25 to 40% by weight, respectively; this is called requirement (A-2). Note that said amounts of A1 and A2 are each based on the weight of the propylene-ethylene block copolymer and the sum of both amounts is 100% by weight. Particularly, the homopolymer portion (A1) and the random copolymer portion (A2) account for from 65 to 75% by weight and from 25 to 35% by weight, respectively.

If the content of the homopolymer portion (A1) is larger than 75% by weight, in other words, if the content of the random copolymer portion (A2) is smaller than 25% by weight, molded articles produced from the composition may have a insufficient impact strength. On the other hand, if the content of the homopolymer portion (A1) is smaller than 60% by weight, in other words, if the content of the random copolymer portion (A2) is larger than 40% by weight, the composition may be too soft and, as a result, molded articles produced from the composition may have an insufficient rigidity.

The isotactic pentad fraction of the homopolymer portion (A1) in the block copolymer (A) is usually 0.97 or more and preferably 0.98 or more from the viewpoints of the rigidity and the heat resistance of molded articles produced from the resin composition.

The ethylene content $(C2')_{EP}$ of the random copolymer portion (A2) in the block copolymer (A) is usually from 25 to 55% by weight and preferably from 30 to 50% by weight from the viewpoint of the impact resistance of molded articles produced from the resin composition. The ethylene content $(C2')_{EP}$ is based on the weight of the random copolymer portion (A2).

The ethylene content (C2') of the block copolymer (A) is usually from 8 to 20% by weight, preferably from 10 to 17% by weight and more preferably from 12 to 15% by weight from the viewpoint of the impact resistance of molded articles produced from the resin composition.

The intrinsic viscosity $[\eta]_{EP}$ of the random copolymer portion (A2) is usually from 1 to 6 dl/g and preferably from 2 to 5.5 dl/g from the viewpoints of the balance between the rigidity and the impact resistance of molded articles produced from the composition, avoidance of occurrence of hard spots in the composition, and the surface quality of the molded articles.

The method for preparing the block copolymer (A) may be a method using a polymerization catalyst wherein the propylene homopolymer portion (A1) is produced in a first step and the propylene-ethylene random copolymer portion (A2) is produced in a second step following the first step.

Examples of the polymerization catalyst include Ziegler-Natta catalysts and metallocene catalysts. The polymerization technique may be, for example, slurry polymerization or gas phase polymerization.

Instead of use of the block copolymer (A) alone, a mixture of the block copolymer (A) and up to 20% by weight of propylene homopolymer may be used. In such a case, a propylene homopolymer similar to the homopolymer portion (A1) in the block copolymer (A) may be employed.

The resin (B) used in the present invention is a resin capable of improving the swelling ratio (SR) of the polypropylene resin composition. The resin (B) exhibits a melt tension (MT), measured at 190° C. at a winding rate of 15.7 m/min, of 0.03 N or more (requirement (B-1)), preferably 0.1 N or more and more preferably 0.15 N or more. The MT of the resin (B) is preferably up to 1 N, and more preferably up to 0.5 N.

If the MT is less than 0.03 N, molded articles produced from the composition may have defective appearance.

The resin (B) exhibits a swelling ratio (SR), measured at 220° C. at an orifice L/D of 40 and at a shear rate of $1.2 \times 10^3$ sec$^{-1}$, of 1.5 or more (requirement (B-2)), preferably 1.7 or more, and more preferably 2.0 or more. The SR of the resin (B) is preferably up to 5.0, and more preferably up to 3.5.

If the SR is less than 1.5, molded articles produced from the composition may have defective appearance.

When the resin (B) is measured for its relaxation modulus at 210° C., it needs 5 seconds or more, measured from the start of the measurement, until it exhibits a relaxation modulus G(t) satisfying an equation G(t)/G(0.02)=0.01 wherein G(0.02) represents a relaxation modulus exhibited at a time of 0.02 seconds measured from the start of the measurement; this is called requirement(B-3). Such a necessary time, which is also referred to as a relaxation time, is preferably 10 seconds or more, and more preferably 15 seconds or more. On the other hand, it is preferably up to 500 seconds, and more preferably up to 300 seconds.

If such a necessary time is less than 5 seconds, molded articles produced from the composition may have defective appearance.

The resin (B) is preferably a resin selected from the group consisting of a propylene-based polymer composition (1) and a polypropylene block copolymer (2) both defined below. Propylene-based polymer composition (1).

The propylene-based polymer composition (1) is a composition composed of:

from 40 to 70% by weight of a propylene-based polymer (I) resulting from polymerization of monomers mainly comprising propylene wherein the polymer (I) has an intrinsic viscosity, measured in tetralin at 135° C., of 5 dl/g or more and a melting peak temperature Tm, measured using a differential scanning calorimeter, of from 130° C. to 166° C.; and from 30 to 60% by weight of a propylene-based polymer (II) resulting from polymerization of monomers mainly comprising propylene wherein the polymer (II) has an intrinsic viscosity, measured in tetralin at 135° C., of up to 2 dl/g. It is preferable that the propylene-based polymer (I) have an intrinsic viscosity of 5.5 dl/g or more and a Tm of from 130° C. to 160° C. The polymer (I) preferably has an intrinsic viscosity of up to 12 dl/g. On the other hand, it is preferable that the propylene-based polymer (II) have an intrinsic viscosity of up to 1.5 dl/g. The polymer (II) preferably has an intrinsic viscosity of 0.6 dl/g or higher, and more preferably 0.7 dl/g or higher.

In the propylene-based polymer composition (I), examples of the propylene-based polymer (I) include propylene homopolymers, propylene-ethylene random copolymers, and propylene-α-olefin random copolymers obtained by copolymerization of propylene and α-olefin having 4 to 12 carbon atoms. Preferred are propylene-ethylene random copolymers.

Examples of the propylene-based polymer (II) include propylene homopolymers, propylene-ethylene random copolymers, and propylene-α-olefin random copolymers obtained by copolymerization of propylene and α-olefin having 4 to 12 carbon atoms.

Polypropylene Block Copolymer (2)

The polypropylene block copolymer (2) is an ethylene-propylene block copolymer made up of a propylene homopolymer portion and an ethylene-propylene random copolymer portion wherein the propylene homopolymer portion has an intrinsic viscosity $[\eta]_P$, measured in tetralin at 135° C., of up to 2 dl/g, the ethylene-propylene random copolymer portion has an intrinsic viscosity $[\eta]_{EP}$, measured in tetralin at 135° C., of from 7 to 15 dl/g and the content of the ethylene-propylene random copolymer portion is from 20 to 40% by weight. The propylene homopolymer portion preferably has an intrinsic viscosity of 0.6 dl/g or higher.

The propylene-based polymer composition (I) and the polypropylene block copolymer (2) each may be produced by polymerizing monomers in the presence of a polymerization catalyst. Examples of the polymerization catalyst include catalyst systems comprising a vanadium compound and an organoaluminum compound, Ziegler-Natta catalyst systems or metallocene catalyst systems. Specific examples are the catalysts disclosed in JP-A-7-216017 and JP-A-10-212319. Examples of the known polymerization methods include solution polymerization, slurry polymerization, high pressure ion polymerization and gas phase polymerization.

The intrinsic viscosity of a resulting polymer can be adjusted by controlling the polymerization temperature and the hydrogen concentration in the polymerization reactor. The melting peak temperature Tm of a resulting polymer can be adjusted by controlling the ethylene concentration in the polymerization reactor.

Examples of the inorganic filler (C) include talc, mica, wollastonite, calcium carbonate, barium sulfate, magnesium carbonate, clay, alumina, silica, calcium sulfate, carbon fibers, glass fibers, metal fibers, quartz sand, carbon black, titanium oxide, magnesium hydroxide, zeolite, molybdenum, diatomaceous earth, sericite, SHIRASU (light gray volcanic ash), calcium hydroxide, calcium sulfite, sodium sulfate, bentonite and graphite. Among them, talc is preferred from the viewpoint of achieving a high impact strength of molded articles produced from the composition and good gloss and good appearance of the molded articles.

The inorganic filler (C) usually has an average particle diameter of 10 µm or less, preferably 5 µm or less. The average particle diameter of the inorganic filler (C) means a 50% equivalent particle diameter D50, which is obtained from an integral distribution curve of the minus sieve method in which talc is suspended in a liquid medium, i.e. water or alcohol, using a centrifugal sedimentation type particle distribution analyzer.

While the inorganic filler (C) may be used in an untreated form, it may be surface-treated with a conventional coupling agent such as a silane coupling agent and a titanium coupling agent or a surfactant in order to improve the interfacial adhesion with polypropylene resins and the dispersibility of talc particles in the polypropylene resins. Examples of the surfactant include higher fatty acids, higher fatty acid esters, higher fatty acid amides and higher fatty acid salts.

The elastomer (D) is not particularly limited but preferably is an elastomer containing a rubber component. Preferred is, for example, an elastomer containing at least one rubber selected from the group consisting of an aromatic vinyl compound-containing rubber (1), an ethylene-α-olefin random copolymer rubber (2) and a propylene-α-olefin random copolymer rubber (3) each described below. Aromatic vinyl compound-containing rubber (1).

The aromatic vinyl compound-containing rubber (1) may be a block copolymer comprising an aromatic vinyl compound polymer block and a conjugated diene polymer block in which preferably, at least 80%, more preferably at least 85% of the double bonds of the conjugated diene polymer block are hydrogenated.

The aromatic vinyl compound-containing rubber preferably has a molecular weight distribution (Q value), measured by gel permeation chromatography (GPC), of 2.5 or less, more preferably 2.3 or less.

It is preferable that the aromatic vinyl compound-containing rubber contain 10 to 20% by weight, more preferably 12 to 19% by weight of the aromatic vinyl compound. Furthermore, the aromatic vinyl compound-containing rubber preferably has a melt flow rate (MFR), measured according to JIS K6758 at 230° C., of 1 to 15 g/10 min, more preferably 2 to 13 g/10 min.

Specific examples of the aromatic vinyl compound-containing rubber (1) include block copolymers such as styrene-ethylene-butene-styrene rubber (SEBS), styrene-ethylene-propylene-styrene rubber (SEPS), styrene-butadiene rubber (SBR), styrene-butadiene-styrene rubber (SBS) and styrene-isoprene-styrene rubber (SIS), each of which may be hydrogenated. In addition, a rubber prepared by reacting an aromatic vinyl compound such as styrene with an olefinic copolymer rubber such as ethylene-propylene-non-conjugated diene rubber (EPDM) can be preferably used. Two or more aromatic vinyl compound-containing rubbers may be used in combination.

The method for preparing the aromatic vinyl compound-containing rubber is not particularly restricted and may be a method in which an aromatic vinyl compound is bonded to an olefinic copolymer rubber or a conjugated diene rubber by polymerization, reaction, etc. Ethylene-α-olefin random copolymer rubber (2).

The ethylene-α-olefin random copolymer rubber (2) is a random copolymer rubber comprising ethylene and an α-olefin. The α-olefin is usually an α-olefin having at least three carbon atoms, for example, propylene, butene-1, pentene-1, hexene-1, heptene-1, octene-1 and decene, preferably propylene, butene-1, hexene-1 and octene-1. Two or more α-olefins may be used in combination.

Specific examples of the ethylene-α-olefin random copolymer rubber (2) include an ethylene-propylene random copolymer rubber, an ethylene-butene-1 random copolymer rubber, an ethylene-hexene-1 random copolymer rubber, an ethylene-octene-1 random copolymer rubber and an ethylene-propylene-butene-1 random copolymer rubber. Preferred are the ethylene-octene-1 random copolymer rubber, the ethylene-butene-1 random copolymer rubber and the ethylene-hexene-1 random copolymer rubber. Two or more ethylene-α-olefin random copolymer rubbers may be used in combination.

Propylene-α-olefin Random Copolymer Rubber (3)

Specific examples of the propylene-α-olefin random copolymer rubber (3) include a propylene-butene-1 random copolymer rubber, a propylene-hexene-1 random copolymer rubber and a propylene-octene-1 random copolymer rubber. Preferred is the propylene-butene-1 random copolymer rubber. Two or more propylene-α-olefin random copolymer rubbers may be used in combination.

In the polypropylene resin composition of the present invention, the content of the propylene-ethylene block copolymer (A) is from 60 to 94.9% by weight, the content of the resin (B) is from 0.1 to 15% by weight, and the content of the inorganic filler (C) is from 5 to 25% by weight. Preferably, the content of the propylene-ethylene block copolymer (A) is from 70 to 89.5% by weight, the content of the resin (B) is from 0.5 to 5% by weight, and the content of the inorganic filler (C) is from 10 to 25% by weight. Note that said contents of the components (A), (B) and (C) are each based on the combined weight of these components.

If the content of the block copolymer (A) is less than 60% by weight, molded articles produced from the composition may have an insufficient impact strength. On the other hand, if it is over 94.9% by weight, the composition is too soft and, as a result, molded articles produced therefrom may have an insufficient rigidity.

If the content of the resin (B) is less than 0.1% by weight, molded articles produced from the composition may not have sufficiently improved appearance. If it is over 15% by weight, the fluidity of the composition may decrease.

If the content of the inorganic filler (C) is less than 5% by weight, the composition is too soft and, as a result, molded articles produced therefrom may have an insufficient rigidity. On the other hand, if it is over 25% by weight, molded articles produced from the composition may have an insufficient impact strength.

When the polypropylene resin composition of the present invention contains an elastomer (D), the content of the propylene-ethylene block copolymer (A) is from 59 to 94.8% by weight, the content of the resin (B) is from 0.1 to 15% by weight, the content of the inorganic filler (C) is from 5 to 25% by weight, and the content of the elastomer (D) is from 0.1 to 4% by weight. Preferably, the content of the propylene-ethylene block copolymer (A) is from 70 to 89.5% by weight, the content of the resin (B) is from 0.5 to 5% by weight, the content of the inorganic filler (C) is from 10 to 25% by weight and the content of the elastomer (D) is from 0.3 to 1% by weight. Note that said contents of the components (A), (B), (C) and (D) are each based on the combined weight of these components.

In the case of the polypropylene resin composition comprising the components (A), (B), (C) and (D), when the content of the block copolymer (A) is less than 59% by weight, molded articles produced from the composition may have an insufficient impact strength. On the other hand, if it is over 94.8% by weight, the composition is too soft and, as a result, molded articles produced therefrom may have an insufficient rigidity.

If the content of the resin (B) is less than 0.1% by weight, molded articles produced from the composition may not have sufficiently improved appearance. If it is over 15% by weight, the fluidity of the composition may decrease.

If the content of the inorganic filler (C) is less than 5% by weight, the composition is too soft and, as a result, molded articles produced therefrom may have an insufficient rigidity. On the other hand, if it is over 25% by weight, molded articles produced from the composition may have an insufficient impact strength.

In addition, if the content of the elastomer (D) is over 4% by weight, molded articles produced from the composition may have insufficient impact resistance.

In one embodiment, a thermoplastic resin composition of the present invention may be produced by mixing and kneading the components. Examples of the apparatus used for the kneading include a single-screw extruder, a twin-screw extruder, a Banbury mixer and a heat roll. The kneading temperature is usually from 170 to 250° C. and the kneading time is usually from 1 to 20 minutes. All the components may be kneaded at the same time, while the components may be successively charged in the kneading apparatus one by one.

Examples of the method for mixing the components successively include the following methods (1) and (2).

Method (1): A method in which propylene-ethylene block copolymer (A) and resin (B) are kneaded and then inorganic filler (C) is added.

Method (2): A method in which propylene-ethylene block copolymer (A) and inorganic filler (C) are kneaded and then resin (B) is added.

In Methods (1) and (2), instead of using the block copolymer (A) alone, using a mixture containing the block copolymer and up to 20% by weight of propylene homopolymer is also permitted.

In the case where the polypropylene-based resin composition contains elastomer (D), examples of the method for mixing the components successively include the following methods (1), (2) and (3).

Method (1): A method in which propylene-ethylene block copolymer (A), resin (B) and inorganic filler (C) are kneaded and then elastomer (D) is added.

Method (2): A method in which propylene-ethylene block copolymer (A), resin (B) and elastomer (D) are kneaded and then inorganic filler (C) is added.

Method (3): A method in which propylene-ethylene block copolymer (A), inorganic filler (C) and elastomer (D) are kneaded and then resin (B) is added.

In the methods (1), (2) and (3) above, instead of using block copolymer (A) alone, using a mixture containing the block copolymer and up to 20% by weight of propylene homopolymer is also permitted.

The polypropylene resin compositions of the present invention may contain additives such as antioxidants, UV absorbers, pigments, antistatic agents, copper inhibitors, flame retardants, neutralizing agents, foaming agents, plasticizers, nucleating agents, foam inhibitors, crosslinking agents and lubricants.

The injection-molded article of the present invention is one obtained by injection molding any of the polypropylene resin compositions of the present invention.

Examples of the applications of the injection molded article of the present invention include automotive parts, electric and electronic appliances and building material parts, and preferably automotive parts.

EXAMPLES

Hereinafter, the present invention will be illustrated by making reference to Examples and Comparative Examples, which do not limit the scope of the present invention.

In Examples and Comparative Examples, physical properties are measured as follows:

(1) Melt Flow Rate (MFR, Unit: g/10 min)

The melt flow rate was measured according to the method defined in JIS-K-6758. Unless otherwise stated, it was measured at a measurement temperature of 230° C. and a load of 2.16 kgf.

(2) Flexural Modulus (Unit: MPa)

The flexural modulus was measured according to the method defined in JIS-K-7203. It was measured under a load speed of 2.0 mm/min at a temperature of 23° C. and a span length of 100 mm using an injection-molded specimen having a thickness of 6.4 mm.

(3) IZOD Impact Strength (Unit: KJ/m$^2$)

The IZOD impact strength was measured according to the method provided in JIS-K-7110. In the measurement, injection-molded notched specimens 3.2 mmin thickness were used. The specimens included ones produced by use of a mold with a projection for forming a notch and ones produced by molding by use of a mold with no projection for forming a notch and then notching. The measurement was carried out at 23° C.

(4) Appearance

The appearance of an injection-molded was observed visually and was judged to be good or poor.

(5) Intrinsic Viscosity ([η], Unit: dl/g)

Reduced viscosities were measured at three concentrations of 0.1, 0.2 and 0.5 g/dl using a Ubbelohde viscometer. The intrinsic viscosity was calculated by the method described in "Polymer Solution, Polymer Experiments vol. 11 (Kobunshi Yoeki, Kobunshi Jikkengaku 11" page 491 (published by Kyoritsu Shuppan Co., Ltd. in 1982), that is, by an extrapolation method in which reduced viscosities are plotted against concentrations and the concentration is extrapolated in zero. With respect to polypropylene, the intrinsic viscosity was measured at 135° C. using tetralin as a solvent.

(6) Molecular Weight Distribution (Q value)

Measurement was carried out by gel permeation chromatography (GPC) under the following conditions.

| | |
|---|---|
| GPC: | Model 150C, manufactured by Waters |
| Column: | two columns available under the name of Shodex 80 MA from Showa Denko K.K. |//continued

| | |
|---|---|
| Amount of sample: | 300 μl (polymer concentration: 0.2 wt %) |
| Flow rate: | 1 ml/min |
| Temperature: | 135° C. |
| Solvent: | O-Dichlorobenzene |

A calibration curve of the elution volume vs. the molecular weight was produced using standard polystyrene manufactured by Tosoh Corp. Using this calibration curve, a weight average molecular weight (Mw) and a number average molecular weight (Mn) of a sample polymer, both in terms of polystyrene-reduced weight, were found. Then, a Q value, i.e. a ratio of Mw to Mn, was obtained, which was used as a measure of molecular weight distribution.

(7) Isotactic Pentad Fraction

The isotactic pentad fraction was determined based on $^{13}$C-NMR measurements as disclosed in A. Zambelli et al., Macromolecules, 6, 925 (1973). That is, the fraction of the propylene monomer units existing in the centers of isotactic chains or chains of five propylene monomer units mesocoupled in series was determined using $^{13}$C-NMR. The NMR absorption peaks were assigned according to the disclosure of Macromolecules, 8, 687 (1975).

Specifically, the isotactic pentad fraction was determined based on the relative ratio of the area of mmmm peaks to the total area of the absorption peaks assigned to methyl carbons in the $^{13}$C-NMR spectrum. When the method was applied to a NPL standard substance CRM No. M19-14 Polypropylene PP/MWD/2 available from the National Physical Laboratory (United Kingdom), its isotactic pentad fraction was 0.944.

(8) Weight ratio (X) of a propylene-ethylene random copolymer portion (A2) to the whole propylene-ethylene block copolymer (A); ethylene content [(C2')$_{EP}$; % by weight] of a propylene-ethylene random copolymer portion (A2) in a propylene-ethylene block copolymer (A); and ethylene content [(C2'), % by weight] of a propylene-ethylene block copolymer (A).

The above properties were calculated based on a $^{13}$C-NMR spectrum measured according to the report of Kakugo et al. (Macromolecules, 15, 1150-1152 (1982)).

In a test tube having a diameter of 10 mm, about 200 mg of a propylene-ethylene block copolymer was uniformly dissolved in 3 ml of o-dichlorobenzene to obtain a sample solution. The solution was subjected to $^{13}$C-NMR spectrum analysis under the following conditions:

| | |
|---|---|
| Temperature: | 135° C. |
| Pulse repeating time: | 10 seconds |
| Pulse width: | 45° C. |
| Accumulation number: | 2500 times |

(9) Intrinsic Viscosity ([η]$_{EP}$; unit: dl/g) of a propylene-ethylene random copolymer portion (A2) in a propylene-ethylene block copolymer (A).

The intrinsic viscosity [η]$_{EP}$ of a propylene-ethylene random copolymer portion (A2) in a propylene-ethylene block copolymer (A) was calculated from the intrinsic viscosity of a propylene homopolymer portion (A1) and that of the block copolymer (A) according to the following equation:

$$[\eta]_{EP}=[\eta]_T/X-(1/X-1)[\eta]_P$$

wherein

[η]$_P$ is the intrinsic viscosity of the propylene homopolymer portion (A1), and $[\eta]_T$ is the intrinsic viscosity of the block copolymer (A).

To measure the intrinsic viscosity $[\eta]_p$ of the propylene homopolymer portion (A1) in the propylene-ethylene block copolymer (A), a propylene homopolymer was sampled just after the first step for preparing a propylene homopolymer portion (A1) in the process for preparing the block copolymer (A) and then the intrinsic viscosity of the sampled polymer was measured.

(10) Melt Tension (MT, Unit: N)

The melt tension of a resin was measured under the following conditions using a melt tension tester RE2 manufactured by Toyo Seiki Seisaku-Sho, Ltd.
  Measuring temperature: 190° C.
  Winding rate: 15.7 mm/min.

(11) Swelling Ratio (SR)

The swelling ratio of a resin was measured under the following conditions using a Capillograph 1B manufactured by Toyo Seiki Seisaku-Sho, Ltd.
  Measuring temperature: 220° C.
  Orifice L/D: 40
  Shear rate: $1.2 \times 10^{-3}$ sec$^{-1}$ (12) Relaxation Time The relaxation modulus of a resin was measured under the following conditions using a mechanical spectrometer RMS-800 manufactured by Rheometrics Co., Ltd.
  Measuring mode: Stress Relaxation
  Measuring temperature: 210.degree. C.
  Plate form: parallel plate 25 mm in diameter
  Distance between plates: 1.9 mm.
  Strained amount: 0.2
  Applied strain: 0.2

Determined was the relaxation time, i.e. the time which the resin needed from the start of the relaxation modulus measurement until it exhibited a relaxation modulus G(t) satisfying an equation G(t)/G(0.02)=0.01 wherein G(0.02) represents a relaxation modulus exhibited at a time of 0.02 seconds measured from the start of the measurement.

Examples 1-2 and Comparative Examples 1-2

(Samples)

Propylene-Ethylene Block Copolymer (A)

Propylene-Ethylene Block Copolymer (A-1)

Propylene-ethylene block copolymer (A-1) is a copolymer comprising a propylene homopolymer portion and a propylene-ethylene random copolymer portion available under the trade name AW191A from The Polyolefin Company. AW191A has an MFR (230° C.) of 10 g/10 min. The propylene homopolymer portion has a molecular weight distribution (Q value) of 4.2 (Mw=111,000; Mn=26,000), an intrinsic viscosity ($[\eta]_P$) of 1.05 dl/g, and an isotactic pentad fraction of 0.97. The propylene-ethylene random copolymer portion has an intrinsic viscosity ($[\eta]_{EP}$) of 2.5 dl/g. The weight ratio of the propylene-ethylene random copolymer portion to the propylene-ethylene block copolymer (A-1) is 30% by weight and an ethylene content of 43% by weight. The properties of A-1 are shown in Table 1.

Propylene-Ethylene Block Copolymer (A-2)

Propylene-ethylene block copolymer (A-2) is a copolymer comprising a propylene homopolymer portion and a propylene-ethylene random copolymer portion available under the trade name AZ564 from Sumitomo Chemical Co., Ltd. AZ564 has an MFR (230° C.) of 30 g/10 min. The propylene homopolymer portion has a molecular weight distribution (Q value) of 4.2, an intrinsic viscosity ($[\eta]_P$) of 1.05 dl/g, and an isotactic pentad fraction of 0.97. The propylene-ethylene random copolymer portion has an intrinsic viscosity ($[\eta]_{EP}$) of 4.0 dl/g. The weight ratio of the propylene-ethylene random copolymer portion to the propylene-ethylene block copolymer (A-2) is 16% by weight and an ethylene content of 45% by weight. The properties of BC-2 are shown in Table 1.

Propylene Homopolymer (A-3)

Propylene homopolymer (A-3) is a propylene homopolymer having a molecular weight distribution (Q value) of 4.2 (Mw=88,000; Mn=21,000), an intrinsic viscosity ($[\eta]_p$) of 0.77 dl/g, an isotactic pentad fraction of 0.99 and an MFR (230° C.) of 320 g/10 min. The propylene homopolymer (A-3) was obtained by a conventional solvent polymerization under a controlled hydrogen concentration at a controlled polymerization temperature in the presence of the catalyst disclosed in JP-A-10-212319.

Resin (B)

Resin (B-1)

Resin (B-1) was an ethylene-propylene block copolymer comprising a propylene homopolymer portion and an ethylene-propylene random copolymer portion. Resin (B-1) had a melt tension (MT), measured at 190° C. at a winding rate of 15.7 m/min, of 0.2 N, a swelling ratio (SR), measured at 220° C. at an orifice L/D of 40 and at a shear rate of $1.2 \times 10^3$ sec$^{-1}$, of 2.3, and a relaxation time of 36 seconds at 210° C.

The propylene homopolymer portion of the ethylene-propylene block copolymer, which is resin (B-1), has a molecular weight distribution (Q value) of 4.0, an intrinsic viscosity [η] of 0.91 dl/g, and an isotactic pentad fraction of 0.99. The ethylene-propylene random copolymer portion has an intrinsic viscosity $[\eta]_{EP}$ of 11.5 dl/g and an ethylene content of 23.1% by weight. The weight ratio of the ethylene-propylene random copolymer portion to the ethylene-propylene block copolymer is 25.1% by weight. The resin (B-1) was obtained by a conventional solvent polymerization in the presence of the catalyst disclosed in JP-A-10-212319. In a former stage, the propylene homopolymer portion was produced under a controlled hydrogen concentration at a controlled polymerization temperature. In a latter stage, the ethylene-propylene random copolymer portion was produced under a controlled hydrogen concentration and a controlled ethylene/propylene concentration.

Resin (B-2)

[Preparation or Resin (B-2)]

(1) Solid Catalyst Component (I)

Following replacement of the atmosphere in a 200-L SUS reactor equipped with a stirrer by nitrogen, 80 L of hexane, 6.55 mol of tetrabutoxytitanium, 2.8 mol of diisobutyl phthalate and 98.9 mol of tetraethoxysilane were feed to form a homogeneous solution. Then, 51 L of a butylmagnesium chloride solution in diisobutyl ether at a concentration of 2.1 mol/L was dropped slowly over 5 hours while holding the temperature in the reactor at 5° C. After the dropping, the mixture was stirred at 5° C. for 1 hour and at room temperature for additional 1 hour. Subsequently, solid-liquid separation was performed at room temperature and washing with 70 L toluene was repeated three times. Then, the amount of toluene was adjusted so that the slurry concentration became 0.2 kg/L and the resulting slurry was stirred at 105° C. for 1 hour. Then, the mixture was cooled to 95° C. and 47.6 mol of diisobutyl phthalate was added, followed by a reaction at 95° C. for 30 minutes. After the reaction, solid-liquid separation was performed and washing with toluene was repeated twice. Then, the amount of toluene was adjusted so that the slurry concentration became 0.4 kg/L, 3.1 mol of diisobutyl phthalate, 8.9 mol of di-n-butyl ether and 274 mol of titanium tetrachloride were added, followed by a reaction at 105° C. for 3 hours. After the completion of the reaction, solid-liquid separation was performed and washing with 90 L toluene at that temperature was carried out twice. The amount of toluene was adjusted so that the slurry concentration became 0.4 kg/L, 8.9 mol of di-n-butyl ether and 137 mol of titanium tetrachloride were added, followed by a reaction at 105° C. for 1 hour. After the completion of the reaction, solid-liquid separation was performed at that temperature and washing with 90 L toluene at the same temperature was carried out three times. After additional three-time washing with 70 L hexane, the residue was dried under reduced pressure, yielding 11.4 kg of solid catalyst component, which contained 1.83% by weight of titanium atom, 8.4% by weight of phthalate, 0.30% by weight of ethoxy group and 0.20% by weight of butoxy group. This solid catalyst component is hereinafter called solid catalyst component (I).

(2) Preliminary Polymerization

In a 3-L SUS autoclave equipped with a stirrer, 25 mmol/L of triethylaluminum (hereafter abbreviated TEA), tert-butyl-n-propyldimethoxysilane (hereafter abbreviated tBunPrDMS) as a proton donor component, wherein tBunPrDMS/TEA=0.1 (mol/mol), and 15 g/L of solid catalyst component (I) were added to hexane which had been fully dewatered and degassed. Subsequently, a preliminary polymerization was carried out by feeding propylene continuously until the amount of the propylene became 1 g per gram of the solid catalyst while keeping the temperature at 15° C. or lower. The resulting preliminary polymer slurry was transferred to a 120-L SUS dilution vessel with a stirrer, diluted by addition of a fully refined liquid butane, and preserved at a temperature of 10° C. or lower.

(3) Main Polymerization

In a 300-L SUS polymerization vessel equipped with a stirrer, liquefied propylene was fed at a rate of 35 kg/h so as to keep a polymerization temperature of 60° C. and a slurry amount of 95 L. Furthermore, ethylene was fed so as to keep an ethylene concentration in a gas phase portion of 2.8 vol %, and a continuous copolymerization of propylene-ethylene was conducted in the substantial absence of hydrogen while feeding TEA at 51 mmol/h, tBunPrDMS at 5 mmol/h and the polymer slurry preliminarily prepared in above (2) as a solid catalyst component at 1.0 g/h, yielding a polymer at 6.1 Kg/h. The resulting polymer was transferred continuously to a second vessel without being deactivated. In the second vessel, a SUS fluidized bed gas phase reactor having a content volume of 1 m³ equipped with a stirrer, propylene and ethylene were continuously fed so as to keep a polymerization temperature of 70° C., a polymerization pressure of 1.8 MPa and an ethylene concentration in a gas phase portion of 1.9 vol %, and a continuous gas phase polymerization was continued using the solid catalyst component-containing polymer transferred from the first vessel in the substantial absence of hydrogen, yielding a polymer at 15.7 kg/h. The polymer component produced in the first and second vessels corresponds to a propylene-based polymer portion (I), and has an intrinsic viscosity [η] of 8.7 dl/g, an ethylene content of 3.5% by weight, and a melting temperature peak of 144.8° C. Subsequently, the resulting polymer was transferred continuously to a third vessel without being deactivated. In the third vessel, i.e. a SUS gas phase fluidized bed reaction vessel having a content volume of 1 m³ equipped with a stirrer, propylene and hydrogen were continuously fed as to keep a polymerization temperature of 85° C., a polymerization pressure of 1.4 MPa and a hydrogen concentration in a gas phase portion of 11.7 vol %, and continuous gas phase polymerization was continued using the polymer containing a solid catalyst component fed from the second vessel, yielding a polymer at 25.6 kg/h. The polymer component produced in the third vessel corresponds to a propylene-based polymer portion (II). The polymer obtained through the first vessel to the third vessel is a propylene-based polymer composition composed of the propylene-based polymer portions (I) and (II), the intrinsic viscosity [η]of which was 5.7 dl/g. From the above-mentioned results, it was determined that the ratio of the total polymerization amount of the first and second vessels to the polymerization amount of the third vessel was 61:39, and the polymer produced in the third vessel had an intrinsic viscosity [η] of 0.9 dl/g.

[Properties of Resin (B-2)]

Resin (B-2) had a melt tension (MT), measured at 190° C. at a winding rate of 15.7 m/min, of 0.3 N, a swelling ratio (SR), measured at 220° C. at an orifice L/D of 40 and at a shear rate of $1.2 \times 10^3$ sec$^{-1}$, of 2.1, and a relaxation time of 226 seconds at 210° C.

Inorganic Filler (C)

As an inorganic filler, talc available under the trade name of MW HS-T from Hayashi Kasei Co. was used. The talc is referred to as Talc-1. Talc-1 has an average particle diameter of 2.7 μm.

Elastomer (D)

An ethylene-hexene-1 copolymer rubber which was prepared at a temperature of 220° C. and a pressure of 78 MPa using the catalyst system disclosed in JP-A-9-87313and which has a density of 0.870 g/cm³ and an MFR (190° C.) of 17 g/10 min.

[Polypropylene Resin Composition]

Components were compounded so that a composition given in Table 2 was established. The components was preliminarily mixed homogeneously with a tumbler and then the mixture was kneaded in a twin-screw kneading extruder (TEX44SS-31.5BW-2V, manufactured by The Japan Steel Works, Ltd.) at an extrusion rate of 50 kg/hr and a screw revolution of 900 rpm under vent suction, yielding a polypropylene resin composition. The resulting polypropylene resin composition was measured for its MFR and the measurement is shown in Table 3.

[Specimens for Physical Property Evaluations]

Specimens for use in physical property evaluations were produced by injection molding in the manner described below.

A composition prepared in the way set forth above was dried in a hot air drier at 120° C. for two hours, and then injection molded using an injection molding machine, model IS150E-V manufactured by Toshiba Machine Co., Ltd. at a molding temperature of 180° C., a mold cooling temperature of 50° C., an injection time of 15 seconds and a cooling time of 30 seconds. The resulting injection molded article was measured for its flexural modulus and IZOD impact strength. The measurements are shown in Table 3.

[Collision Test]

Using a polypropylene resin composition, a molded piece A was formed in the method set forth below. Using the molded piece A, a collision test was carried out and the result is shown in Table 4.

(1) Molded Piece A

Figure 1:
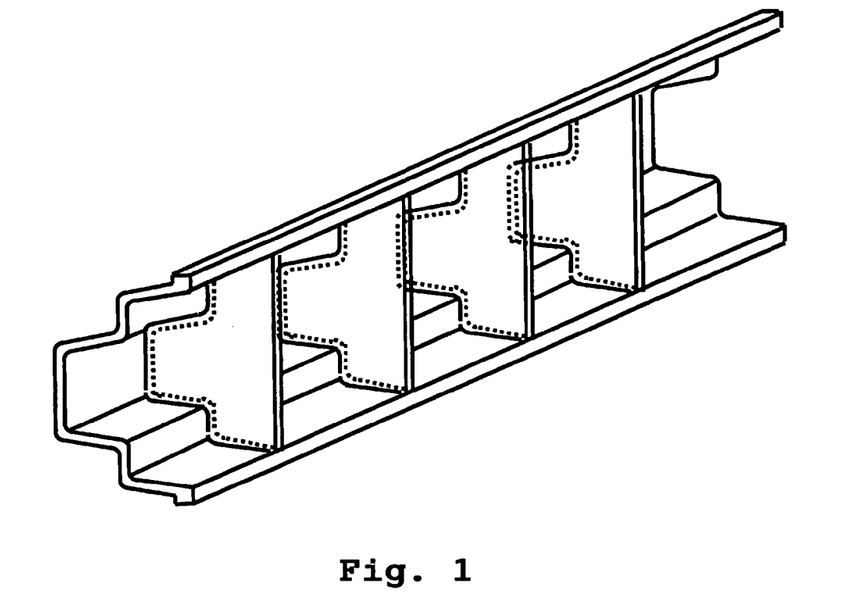
FIG. 1 shows a molded piece A when viewed from its front side.
Figure 2:
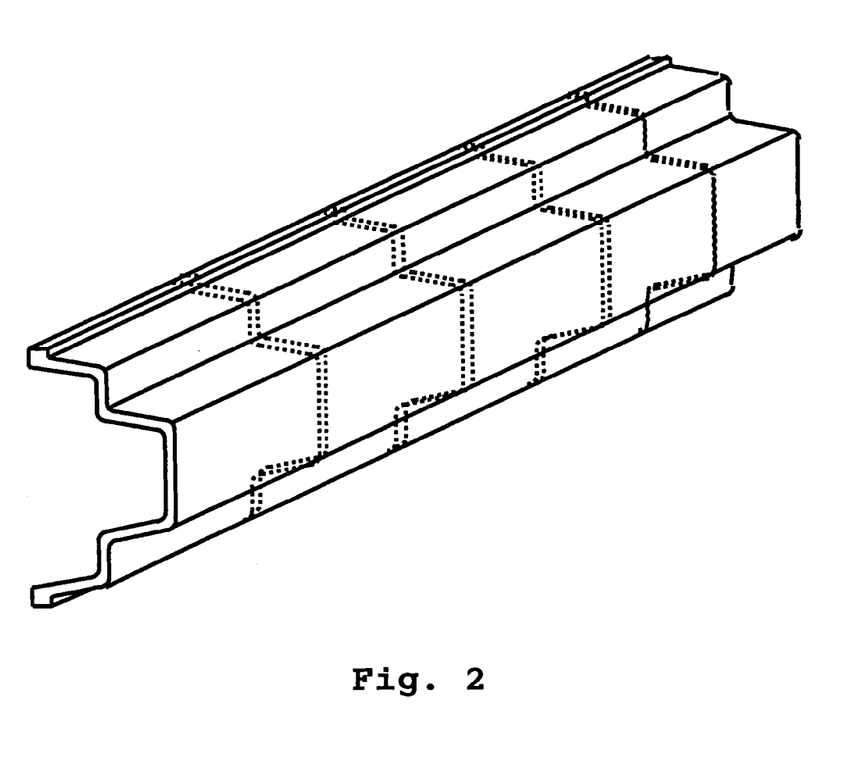
FIG. 2 shows a molded piece A when viewed from its rear side.

For a collision test, a molded piece A having a channel-like shape in section shown in FIGS. 1 and 2 was used.

FIG. 1 shows the sectional shape of the molded piece A viewed from the front. The molded piece A has a two-level channel-like shape and, as shown in FIG. 2, it has reinforcing ribs spaced at regular intervals. The molded piece A was designed to have a width of 115 mm, a length of 500 mm, a central groove depth of 30 mm and a total depth of 70 mm. The molded piece, except the reinforcing ribs, has a uniform thickness of 3.00 mm. The ribs were tapered so that the molded piece could be ejected easily from a mold.

The molded piece A was produced by molding a polypropylene resin composition prepared in the above-mentioned process. The molding was conducted under the following conditions:

(Injection molding machine)
Machine: IS650E manufactured by Toshiba Machine Co., Ltd.
Clamping force: 650 ton
Screw diameter: 90 mm
L/D: 20
type: full flight (Mold for injection molding)
Shape of cavity: corresponding to a channel-like molded piece sized 115 mm × 500 mm × 70 mm.
Gates: centrally-arranged tab gate (Injection molding conditions)
Cylinder temperature: 220° C.
Mold temperature: 50° C.

TABLE 1

| Sample | A-1 | A-2 |
|---|---|---|
| MFR (230° C.) (g/10 min) | 10 | 30 |
| Homopolymer portion [η]$_P$(dl/g) | 1.05 | 1.05 |
| Isotactic pentad fraction (%) | 0.97 | 0.97 |
| Random copolymer portion [η]$_{EP}$ (dl/g) | 2.5 | 4.0 |
| Weight ratio (% by weight) | 30 | 16 |
| (C2')$_{EP}$ (% by weight) | 43 | 45 |
| Block copolymer portion (C2') (% by weight) | 12.7 | 7.2 |

TABLE 2

| | Example | | | | Comparative Example | | |
|---|---|---|---|---|---|---|---|
| | 1 | 2 | 3 | 4 | 1 | 2 | 3 |
| A-1 | 66 | 67 | 65.5 | 57 | 52 | 68 | 0 |
| A-2 | 0 | 0 | 0 | 0 | 0 | 0 | 66 |
| A-3 | 10 | 11 | 10 | 16 | 19 | 11 | 0 |
| B-1 | 3 | 0 | 3 | 3 | 3 | 0 | 3 |
| B-2 | 0 | 1 | 0 | 0 | 0 | 0 | 0 |
| C | 21 | 21 | 21 | 21 | 21 | 21 | 21 |
| D | 0 | 0 | 0.5 | 3 | 5 | 0 | 10 |

TABLE 3

| | Example | | | | Comparative Example | | |
|---|---|---|---|---|---|---|---|
| | 1 | 2 | 3 | 4 | 1 | 2 | 3 |
| MFR(230° C.) (g/10 min) | 14 | 15 | 15 | 18 | 21 | 16 | 22 |
| Flexural modulus (MPa) | 2270 | 2400 | 2280 | 2340 | 2250 | 2420 | 2380 |
| IZOD(A) (23° C.) (kJ/m$^2$) | 44.4 | 32.2 | 52.7 | 41.9 | 48.1 | 32.4 | 39.5 |
| IZOD(B) (23° C.) (kJ/m$^2$) | 26.3 | 19.0 | 30.0 | 22.9 | 47.2 | 18.8 | 35.3 |
| IZOD(A)/IZOD(B) | 1.69 | 1.69 | 1.76 | 1.83 | 1.02 | 1.72 | 1.12 |
| Appearance | Good | Good | Good | Good | Good | Poor | Good |

(2) Collision Test

Figure 3:
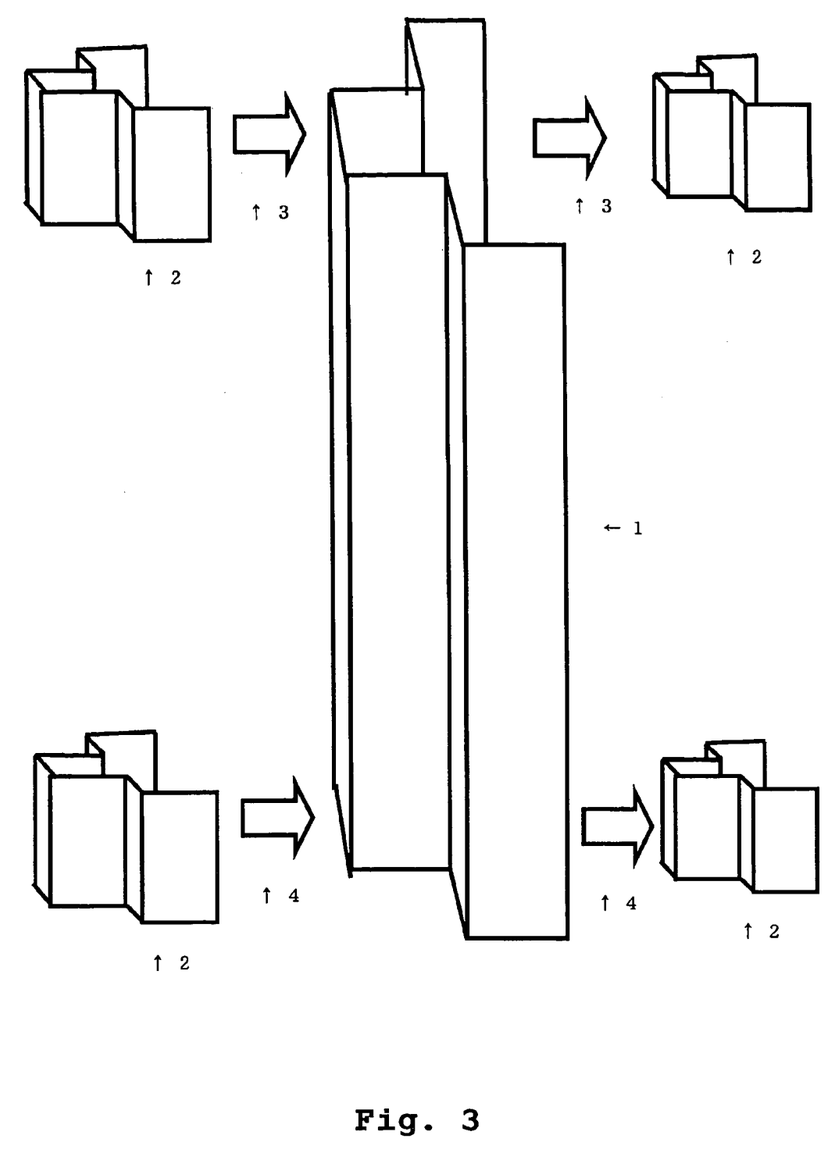
FIG. 3 illustrates the manner of fastening a molded piece A. Referential numerals 1 and 2 indicate a molded piece A and fittings, respectively. The open arrows each indicated by numeral 3 mean fastening the upper end of the molded piece with fittings. The open arrows each indicated by numeral 4 mean fastening the lower end of the molded piece.
Figure 4:
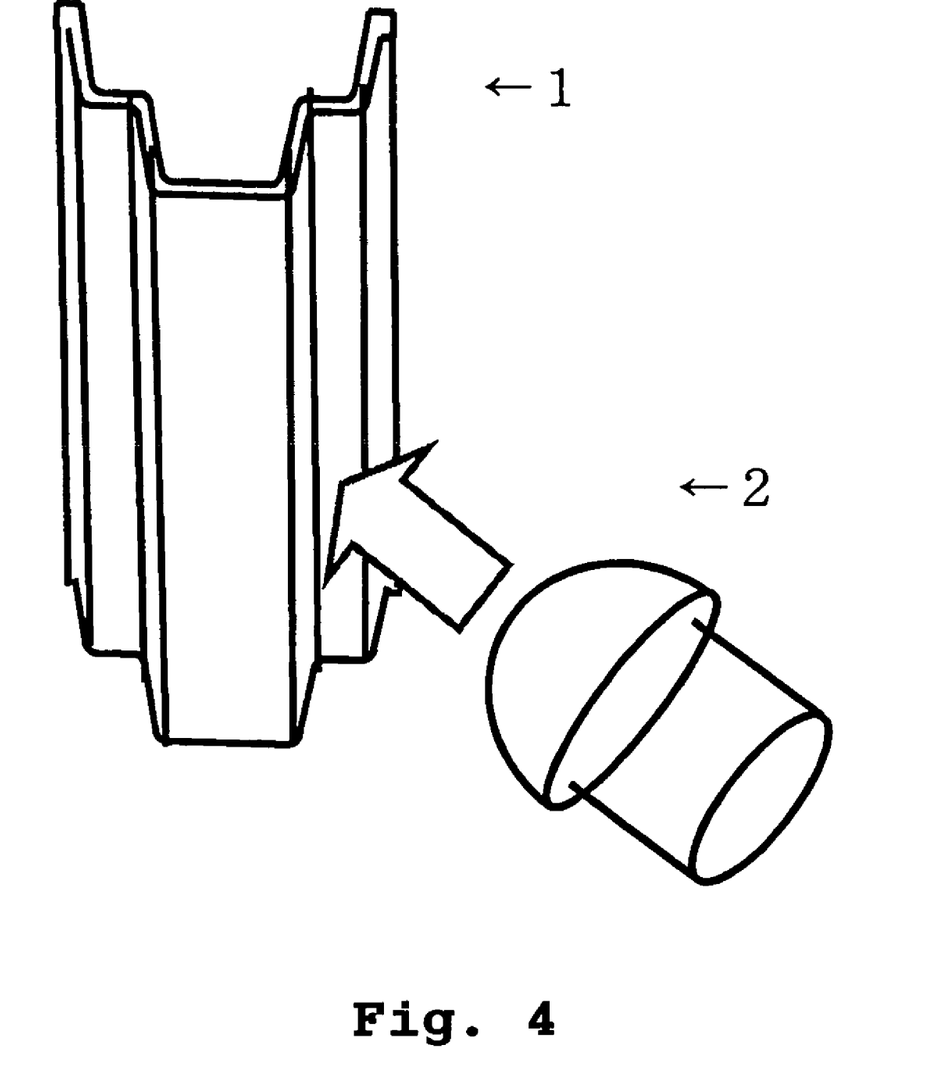
FIG. 4 illustrates the manner of the collision test. Referential numeral 1 indicates a molded piece A fastened at its upper and lower end with fittings. The open arrow indicated by numeral 2 means the collisional movement of a hemispherical dart at an angle of 45°.

For testing the impact absorbing properties of the molded piece A, a collision test was conducted in a manner shown in FIGS. 3 and 4. First, the molded piece was fastened at its both ends with metal fittings as shown in FIG. 3. Then, a hemispherical dart was moved forward at a constant speed to collide with the molded piece from its front as shown in FIG. 4 and the deformation of the molded piece and the load applied thereto were measured. The dart is of a hemispherical form with a diameter of 165 mm and was forced to collide with the molded piece A at an angle of 45° with respect thereto.

The dart weighed 6.8 kg. As shown in Table 4, the test was repeated at three speeds within the range from 5.0 m/s to 6.0 m/s.

TABLE 4

| Collision speed (m/s) | Example | | | | Comparative Example | | |
|---|---|---|---|---|---|---|---|
| | 1 | 2 | 3 | 4 | 1 | 2 | 3 |
| 5.0 | ○ | ○ | ○ | ○ | ○ | ○ | ○ |
| 5.5 | ○ | ○ | ○ | ○ | Δ | ○ | Δ |
| 6.0 | ○ | ○ | ○ | Δ | X | ○ | X |

○: Neither crevices nor cracks were formed.
Δ: No cracks were formed.
X: No crevices were formed.

The molded articles of Examples 1, 2, 3 and 4, which satisfy the requirements of the present invention, have good appearance and exhibit good impact resistances.

In contrast, the molded article of Comparative Example 1, which contains too much elastomer (D), is insufficient with respect to impact resistance.

The molded article of Comparative Example 2, which contains no resin (B), is insufficient with respect to appearance.

The molded article of Comparative Example 3, which has a too small content of the propylene-ethylene random copolymer portion in the propylene-ethylene block copolymer (A) and contains too much elastomer (D), is insufficient in impact resistance.

What is claimed is:

1. A polypropylene-based resin composition consisting essentially of:
   from 60 to 94.9% by weight of propylene-ethylene block copolymer (A) which satisfies requirement (A-1) and (A-2) defined below or a mixture of the propylene-ethylene block copolymer (A) and 20% by weight or less of propylene homopolymer, wherein the copolymer (A) does not satisfy one or more of the requirements (B-1), (B-2) and (B-3) defined below;
   from 0.1 to 15% by weight of resin (B) which satisfies the requirement (B-1), (B-2) or (B-3);
   from 5 to 25% by weight of inorganic filler (C), wherein said amounts of the components (A), (B) and (C) are each based on the combined weight of these components and said amount of the propylene homopolymer is based on the weight of the mixture of the propylene-ethylene block copolymer (A) and the propylene homopolymer:
   requirement (A-1): the copolymer is a propylene-ethylene block copolymer composed of a propylene homopolymer portion (A1) and a propylene-ethylene random copolymer portion (A2);
   requirement (A-2): the copolymer has a propylene homopolymer portion (A1) in a content of from 60 to 75% by weight and a propylene-ethylene random copolymer portion (A2) in a content of from 25 to 40% by weight, wherein said contents of the portions A1 and A2 are each based on the weight of the propylene-ethylene block copolymer composed of the portions A1 and A2 and the sum of both contents is 100% by weight;
   requirement (B-1): the resin has a melt tension (MT), measured at 190° C. at a winding rate of 15.7 in/mm, of 0.03 N or more;
   requirement (B-2): the resin has a swelling ratio (SR), measured at 220° C. at an orifice L/D of 40 and at a shear rate of $1.2 \times 10^3$ sec$^{-1}$, of 1.5 or more; and
   requirement (B-3): when the resin is measured for its relaxation modulus at 210° C., it needs 5 seconds or more, measured from the start of the measurement, until it exhibits a relaxation modulus G(t) satisfying an equation G(t)/G(0.02)=0.01 wherein G(0.02) represents a relaxation modulus exhibited at a time of 0.02 seconds measured from the start of the measurement.

2. A polypropylene-based resin composition comprising:
   from 59 to 94.8% by weight of propylene-ethylene block copolymer (A) which satisfies requirement (A-1) and (A-2) defined below or a mixture of the propylene-ethylene block copolymer (A) and 20% by weight or less of propylene homopolymer, wherein the copolymer (A) does not satisfy one or more of the requirements (B-1), (B-2) and (B-3) defined below;
   from 0.1 to 15% by weight of resin (B) which satisfies the requirement (B-1), (B-2) or (B-3);
   from 5 to 25% by weight of inorganic filler (C); and
   from 0.1 to 4% by weight of elastomer (D), which is an elastomer other than propylene-ethylene block copolymer (A) and resin (B), wherein said amounts of the components (A), (B) (C) and (D) are each based on the combined weight of these components and said amount of the propylene homopolymer is based on the weight of the mixture of the propylene-ethylene block copolymer (A) and the propylene homopolymer:
   requirement (A-1): the copolymer is a propylene-ethylene block copolymer composed of a propylene homopolymer portion (A1) and a propylene-ethylene random copolymer portion (A2);
   requirement (A-2): the copolymer has a propylene homopolymer portion (A1) in a content of from 60 to 75% by weight and a propylene-ethylene random copolymer portion (A2) in a content of from 25 to 40% by weight, wherein said contents of A1 and A2 are each based on the weight of the propylene-ethylene block copolymer composed of the portions A1 and A2 and the sum of both contents is 100% by weight;
   requirement (B-1): the resin has a melt tension (MT), measured at 190° C. at a winding rate of 15.7 m/min, of 0.03 N or more;
   requirement (B-2): the resin has a swelling ratio (SR), measured at 220° C. at an orifice L/D of 40 and at a shear rate of $1.2 \times 10^3$ sec$^{-1}$, of 1.5 or more; and
   requirement (B-3): when the resin is measured for its relaxation modulus at 210° C., it needs 5 seconds or more, measured from the start of the measurement, until it exhibits a relaxation modulus G(t) satisfying an equation G(t)/G(0.02)=0.01 wherein G(0.02) represents a relaxation modulus exhibited at a time of 0.02 seconds measured from the start of the measurement.

3. The polypropylene-based resin composition according to claim 1, wherein the ratio of IZOD impact strength (A) defined below to IZOD impact strength (B) defined below is 1.4 or more:
   IZOD impact strength (A): an IZOD impact strength measured by the method provided in JIS-K-7110 at 23° C. using a 3.2 mm thick specimen molded with a notched mold; and
   IZOD impact strength (B): an IZOD impact strength measured by the method provided in JIS-K-7110 at 23° C. using a 3.2 mm thick specimen which was molded with a mold without notches and thereafter was notched.

4. An injection-molded article made of the polypropylene-based resin composition according to claim 1.

5. The polypropylene-based resin composition according to claim 2, wherein the ratio of IZOD impact strength (A) defined below to IZOD impact strength (B) defined below is 1.4 or more:
   IZOD impact strength (A): an IZOD impact strength measured by the method provided in JIS-K-7110 at 23° C. using a 3.2 mm thick specimen molded with a notched mold; and
   IZOD impact strength (B): an IZOD impact strength measured by the method provided in JIS-K-7110 at 23° C. using a 3.2 mm thick specimen which was molded with a mold without notches and thereafter was notched.

6. An injection-molded article made of the polypropylene-based resin composition according to claim 2.

7. An injection-molded article made of the polypropylene-based resin composition according to claim 3.

8. An injection-molded article made of the polypropylene-based resin composition according to claim 5.

* * * * *